Dec. 14, 1965    D. E. VALVERDE    3,222,740
SUN SCREENS
Filed Dec. 23, 1963    2 Sheets-Sheet 1
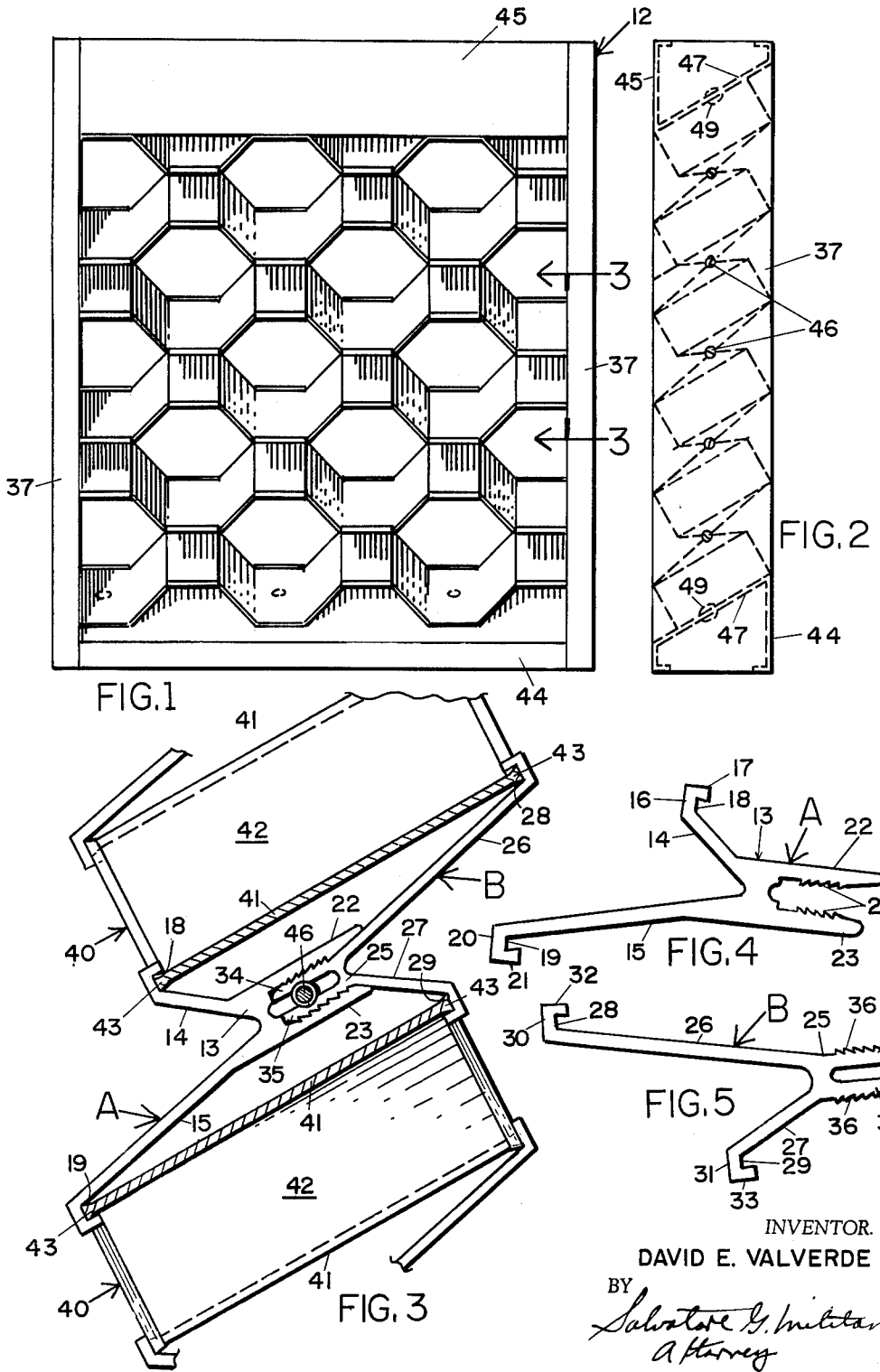
INVENTOR.
DAVID E. VALVERDE Dec. 14, 1965     D. E. VALVERDE     3,222,740
SUN SCREENS Filed Dec. 23, 1963     2 Sheets-Sheet 2

INVENTOR.
DAVID E. VALVERDE
BY *Salvatore G. Militana*
attorney

United States Patent Office 3,222,740
Patented Dec. 14, 1965

3,222,740
SUN SCREENS
David E. Valverde, Miami, Fla., assignor to Metallic Engineering Co., Inc., Miami, Fla., a corporation of Florida
Filed Dec. 23, 1963, Ser. No. 332,345
2 Claims. (Cl. 24—83)

This invention relates generally to grilles or sun screens and is more particularly directed to a sun screen provided with a two piece connector or clip and an I-beam tracery bar.

In U.S. Patent No. 3,004,642 issued to E. C. Hallock on October 17, 1961, there is shown a grille or sun screen constructed of a plurality of horizontally disposed tracery bars secured together by a clip or connector having a pair of upper and lower arms that are slotted at their ends for engaging two tracery bars. In order for the arms to grip the tracery bar by having the slotted portion receive the edges of the tracery bars, the arms have to be sprung apart and then released. It is apparent that this construction compels the clips to be made of resilient material rather than of rigid and strong metal and that the assembly thereof is complicated requiring special tools for assembly.

On the other hand, the present invention contemplates a clip or connector which is made of two parts that interlock when assembled with the tracery bars held firmly and securely in deep slotted portions formed at the ends of the arms. Also, the tracery bars used in the present invention are I-beam in shape thereby giving the sun screen an appearance of having thicker tracery bars.

Therefore, a principal object of the present invention is to provide a sun screen with clips or connectors having interlocking portions permitting deep grooves for engaging the edges of the tracery bars.

Another object of the present invention is to provide sun screens which are easily assembled and whose parts are interlockingly engaged without the danger of becoming disengaged.

A further object of the present invention is to provide a sun screen in which the clips or connectors are extremely sturdy and rigid and the tracery bars are I-beam in cross section thereby giving the appearance that a heavier bar is being used to reduce both the cost of the sun screen and overall weight of material used without sacrificing the strength and durability thereof.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a front elevational view of a grille or sun screen constructed in accordance with my invention.

FIGURE 2 is a side elevational view thereof.

FIGURE 3 is a detailed cross sectional view taken along the line 3—3 of FIGURE 1.

FIGURE 4 is a side view of one portion of my clip.

FIGURE 5 is a similar view of the other portion of my clip.

Figure 6:
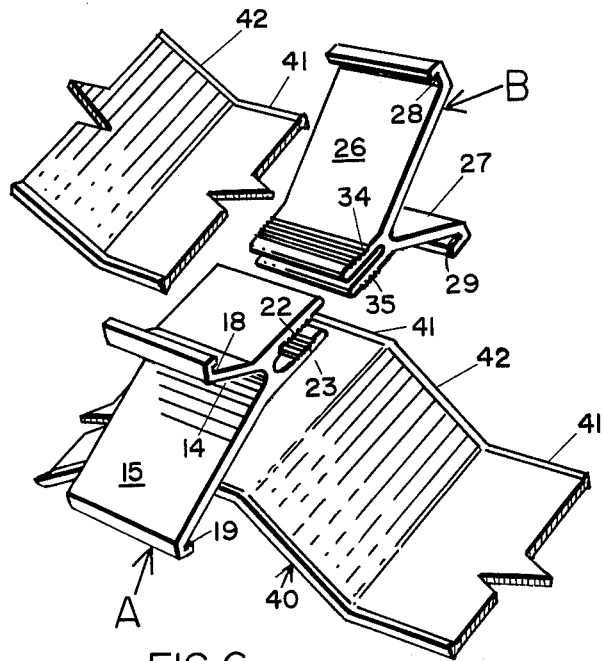
FIGURE 6 is a fragmentary exploded view showing the manner of assembly of my clips and tracery bars.

Referring to the drawings wherein like numerals are used to designate similar parts throughout the several views, the numeral 10 refers to my improved clip which in combination with tracery bars 40 and frame 12 form the grille or sun screen shown in FIGURE 1.

The clip 10 consists of a pair of interlocking members A and B each consisting of a main body portion from which a pair of arm portions extend outwardly on one side thereof and interlocking portions on the other side. Specifically the interlocking member A consists of a main body portion 13 having arm portions 14 and 15 extending outwardly on one side thereof. The arm portion 14 terminates in a web or end wall 16 which is positioned at an oblique angle to the arm portion 14 with a return portion 17 positioned at right angle to the end wall 16 to form an internal slot 18. The arm portion 15 is likewise provided with an internal slot 19 formed by a return portion 21 positioned at right angle to an end wall 20 which is mounted at an oblique angle to the arm portion 15.

On the other side of the main body portion 13 is the interlocking portion consisting of a pair of fingers 22 and 23 mounted in spaced parallel relation with each other. Each of the fingers 22 and 23 are provided with a plurality of serrations 24 along their inner surfaces. The serrations 24 are inclined in the direction of the main body portion 13 as best shown by FIGURE 4.

The interlocking member B consists of a main body portion 25 with arm portions 26 and 27 extending outwardly on one side thereof. Both arm portions 26 and 27 terminate in internal slots 28 and 29 formed by end walls 30 and 31 positioned at an oblique angle to the free ends of the arm portions 26 and 27 and return portions 32 and 33 extending at right angle to the end walls 30 and 31 respectively.

Extending outwardly at the other side of the main body portion 25 is the pair of spaced parallel fingers 34 and 35 having a plurality of serrations 36 along the outer surfaces of the fingers 34 and 35. The serrations 36 are inclined in the direction of the main body portion 25 so that when they are interengaged with the serrations 24 of the interlocking member A as explained in detail hereinafter, the interlocking members A and B cannot become separated.

Extending horizontally between the vertical frame members 37 are tracery bars 40 bent into a corrugated shape having a plurality of offset parallel portions 41 joined by inclined portions 42, the parallel portions 41 being engaged by the clips 10 as indicated hereinafter. The tracery bars 40 are I-beam in cross sectional shape having enlarged edge portions 43 to give the tracery bars 40 an appearance of being of heavier gauge or thickness than in actuality.

My grille or sun screen is adapted to the constructed to cover any size wall or opening from the small size of a window opening to the face or wall of a multi-storied building. In any event my grille which is assembled at the shop and erected into position on the building wall consists of the frame 12 having upright members 37 with headers 44 and 45 fastened at their ends to the upright members 37. Extending horizontally between the upright members 37 are the tracery bars 40 with the clips 10 engaging and fastening together adjacently positioned tracery bars 40. The lower offset portions 41 of each of the tracery bars 40 are caused to be fastened to the upper offset portion 41 of the adjacent upper tracery bar 40 to form a firmly interlocked grille or sun screen. This is accomplished with ease and by the use of a tool similar to a pair of pliers by placing the interlocking member A between a pair of tracery bars 40 with the forward edges 43 of the offset portions 41 received by the slots 18 and 19. Then the interlocking member B is placed between the same offset portions 41 in alignment with the interlocking member A with the slots 28 and 29 receiving the rear edges 43 of the tracery bars 40 and the finger members 34, 35 fitted between the finger members 22, 23. With the plier-like tool engaging the outer surfaces of the body members 13 and 25 and a force exerted thereon, the finger members 34 and 35 are made to slide inwardly of the finger members 22 and 23 in telescopic fashion until completely seated as shown by FIGURE 3. The serrations 24 of the member A interlock the serrations 36 of the member B and prevent the separation of the two members. In the locked position, the clip 10 will grip the tracery bars 40 tightly with the end walls 16, 20 of the member A and the end walls 30, 31 of the member B engaging the enlarged edge portions 43 of the tracery bars 40. The clips 10 which abut against the upright frame members 37 are fastened thereto by screws 46 extending into the slot formed between the fingers 34, 35 of the interlocking member B. At the headers 44 and 45, a flat tracery bar 47 is provided and engaged by the clips 10 adjacent thereto with rivets 49 fastening the tracery bars 47 to the headers 44 and 45.

It can be readily noted that many different arrangements and effects can be produced by varying the sizes of the clips 10 and providing differently shaped tracery bars. The grille or sun screen shown by FIGURE 1 provides octagonal shaped openings with the horizontally disposed tracery bars 40 inclined so that the forward edges are in a lower plane than the rear edges. This effect is accomplished by providing the members A and B each with arms 14, 15 (26, 27) of unequal lengths.

Figure 8:
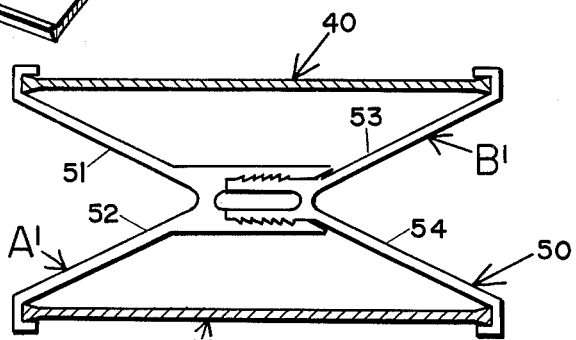
FIGURE 8 is a side elevational view of structure similar to FIGURE 3 showing a modified structure of my clip.
Figure 7:
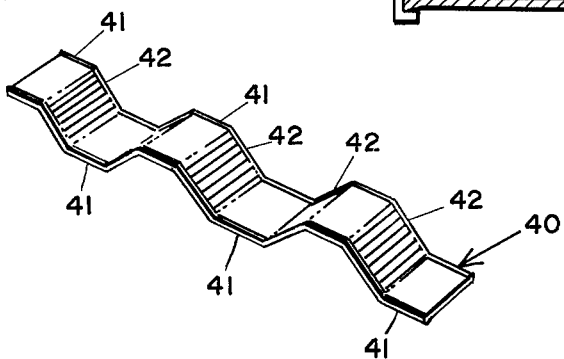
FIGURE 7 is a perspective view of a tracery bar.

As shown by FIGURE 8 the clip 50 consisting of interlocking members A' and B' are of substantially identical construction as the clip 10 described hereinabove except that the arms 51, 52, 53 and 54 are of equal lengths. The effect produced by this structure is decidedly different from that shown by FIGURE 1 in that the tracery bars 40 will extend horizontally with the front and rear edges thereof lying in a horizontal plane. Also, the shape of the tracery bar 40 may be varied as desired except that the offset portions 41 must be flat and in parallel relation while the inclined portions 42 may be arcuate or bent to form polygonal shapes.

What I claim as new and desire to secure by Letters Patent of the United States is:

1. A clip for grilles, sun screens and the like comprising a pair of body portions positioned in proximity of each other, a pair of finger portions mounted on one side of each of said body portions and extending in a direction toward the other of said body portions, said pairs of finger portions being telescopically engaged, a pair of arm portions extending outwardly of the other side of said body portions and extending at an oblique angle away from said body portions and a slotted portion mounted at the free edge of each of said arm portions for receiving an edge portion of a tracery bar.

2. A clip for grilles, sun screens and the like comprising a pair of body portions positioned in proximity of each other, a pair of finger portions mounted on one side of each of said body portions and extending in a direction toward the other of said body portions, said pairs of finger portions having a plurality of serrations telescopically securing said finger portions together, a pair of arm portions extending outwardly of the other side of said body portions and extending at an oblique angle away from said body portions, a web portion mounted at the free end of each of said arm portions and a return portion mounted at the free end of said web portion at substantially right angle thereto whereby a slotted portion is formed for receiving the edge portion of a tracery bar.

References Cited by the Examiner

UNITED STATES PATENTS

| | | |
|---|---|---|
| D. 193,210 | 7/1962 | Hallock. |
| 2,677,157 | 5/1954 | Stefanakis _____ 186—62 X |
| 2,915,267 | 12/1959 | Kaysing _____ 24—263 X |
| 2,918,240 | 12/1959 | Wiegand _____ 24—16 X |
| 3,004,642 | 10/1961 | Hallock _____ 189—82 |

FOREIGN PATENTS

| | | |
|---|---|---|
| 1,105,961 | 7/1955 | France. |
| 714,331 | 8/1954 | Great Britain. |

OTHER REFERENCES

Top Side Fasteners for Cemesto Board (a 4-page Celotex Corp. pamphlet).

WILLIAM FELDMAN, *Primary Examiner.*

DONLEY J. STOCKING, *Examiner.*

D. GRIFFIN, *Assistant Examiner.*